May 26, 1953  G. ASPINALL  2,639,561
EGG CLEANER
Filed Aug. 3, 1951  2 Sheets-Sheet 1

INVENTOR
GLENN ASPINALL

BY
ATTORNEYS

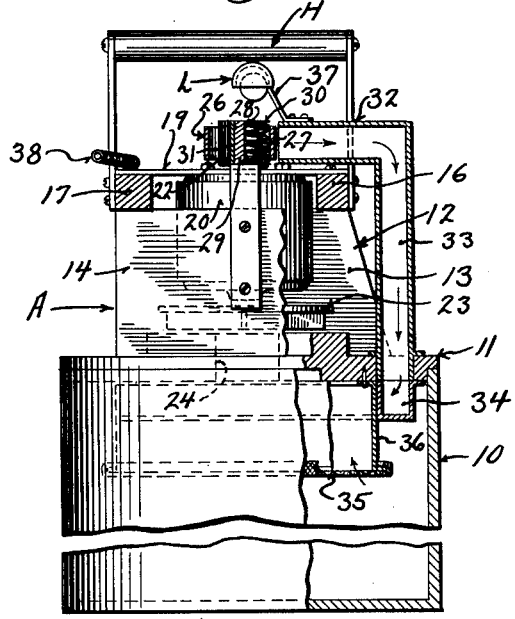
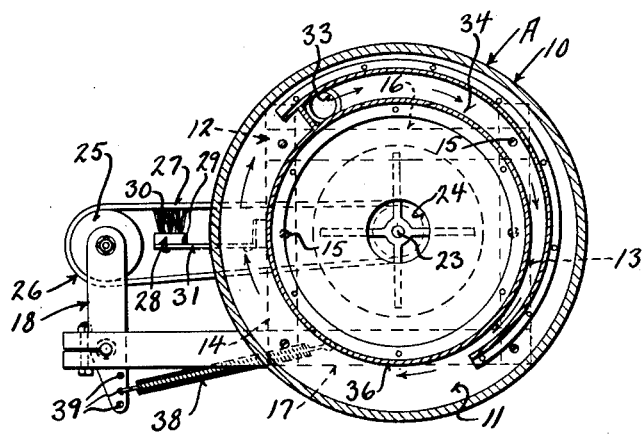
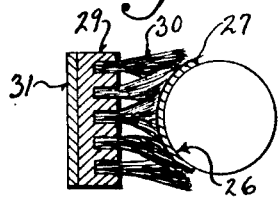

Patented May 26, 1953

2,639,561

UNITED STATES PATENT OFFICE 2,639,561

EGG CLEANER

Glenn Aspinall, Burlington, Wis.

Application August 3, 1951, Serial No. 240,079

8 Claims. (Cl. 51—141)

This invention relates to egg cleaners and more particularly to the type of egg cleaner in which the egg is cleaned by bringing it into contact with a moving abrasive belt.

Farmers have long recognized the fact that cleaned eggs demand a substantially higher price than uncleaned eggs.

Consequently all farmers who have eggs for sale, if at all possible, clean the eggs before shipping them to the market. One method has been to wipe the eggs off with a damp cloth. Not only is this a tedious task, but it also has the disadvantage of dissolving and wiping off some of the natural protective film from the egg shell. To eliminate this disadvantage, some farmers utilize a dry abrasive hand brush, but this is an arduous and slow way of egg cleaning, and any undue pressure on the brush or egg will easily break a thin shelled egg. This method is also extremely hard on people who suffer from heart trouble and like ailments, and who are susceptible to chest pains caused by the motion of hand brushing.

Recognizing these disadvantages, others heretofore have devised machines for automatically cleaning eggs, comprising elaborate means for turning and holding the eggs in engagement with moving abrasive belts, strips or loops. All prior art egg cleaning machines, however, have been complicated and expensive to use, and invariably the thin shelled eggs are broken during the cleaning operation.

One of the primary objects of my invention is to provide an egg cleaning machine that is faster than cleaning with the abrasive hand brush, and much less tedious, and is advantageous over automatic machines in that each egg is manually presented to the abrasive belt and receives just the attention needed to clean it, thereby prolonging the life of the abrasive and greatly decreasing egg breakage.

Another object of my invention is to provide a dry abrasive cleaning of eggs that does not have the disadvantage of dissolving or wiping off the protective film from the egg shell.

A salient feature of my invention is to provide an endless abrasive belt in which the cross section thereof lies in a vertical plane, and one in which the direction of motion of both stretches lies in the same horizontal plane, whereby the cleaning of the spots from an egg may be easily and readily observed by the operator.

Another important object of my invention is to provide an egg cleaning machine having a resilient or flexible backing member mounted behind the egg cleaning stretch of the belt and which causes the abrasive belt to conform to the curvature of the egg held there-against.

A further object of my invention is to provide a belt tensioning means which is arranged to allow the belt to move freely under light tension and to spring inward when an egg is held against it.

A more specific object of my invention is to provide my egg cleaning machine with suction means adjacent the egg cleaning stretch of the abrasive belt adapted to receive the dust resulting from the cleaning operation and to deposit it in a suitable receptacle.

A still further object of my invention is to provide a portable egg cleaning unit of an attractive appearance and of a comparative small size, and one which can be placed upon the market at a reasonable cost, and one which will be durable and efficient in use.

With the above and other objects in view, which will more readily appear as the nature of the invention is better understood, the same consists in the novel construction, combination and arrangement of parts hereinafter more fully described, illustrated and claimed.

A preferred and practical embodiment of my invention is shown in the accompanying drawings, in which:

Figure 3 is a front elevational view, partly in section, the section being taken on the line 3—3 of Figure 1 and looking in the direction of the arrows;

Figure 4 is a bottom plan view in section illustrating in particular the path of travel of the dust resulting from the egg cleaning operation, the section being taken on the line 4—4 of Figure 2, and looking in the direction of the arrows;

Figure 5 is an enlarged transverse sectional view taken on the line 5—5 of Figure 2, looking in the direction of the arrows, and showing how the backing member flexes and causes the belt to conform to the curvature of the egg being cleaned.

Referring to the drawings in detail, wherein similar reference characters designate corresponding parts throughout the several views, the letter A generally indicates one type of my improved egg cleaning machine.

Figure 1:
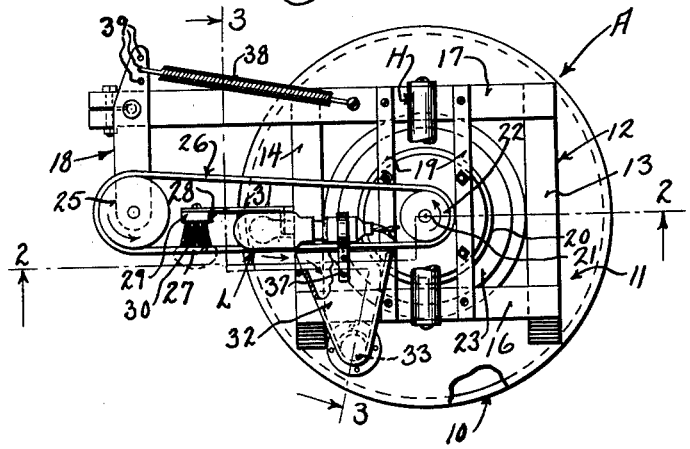
Figure 1 is a top plan view of my egg cleaning machine and illustrating in dotted lines the position of the egg and belt during the cleaning operation.

The egg cleaning machine A may be made from any suitable material, but for the most part, I prefer to use wood, as shown, and the machine A includes broadly a receptacle 10 for dust, having a removable cover 11 on which is supported the operating parts of the machine. The operating parts are supported by a frame 12 which includes two parallel upright members 13 and 14 securely bolted to the cover 11 by means of countersunk screws 15. Joining the two upright members at their respective ends and extending across the top surfaces thereof are two beams 16 and 17. Beam 17 extends well beyond beam 16 and has pivotally mounted to the outer end thereof a belt tightening member 18.

Extending centrally across the top of the beams 16 and 17 is a pair of metal straps 19 from which is suspended an electric motor 20. The upper end of the armature shaft 21 of the motor 20 has keyed thereto a drive pulley 22, and the lower end has secured thereto a suction fan 23 suitably disposed above a suction opening 24 in the cover 11.

As best shown by Figure 1 of the drawing, the belt tightener 18 has rotatably mounted on the outer end thereof an idle pulley 25, and trained about the drive pulley 22 and the idle pulley 25 is the endless belt 26 of abrasive coated fabric or a like material.

Behind the egg cleaning stretch 27 of the abrasive belt 26 at the point where the egg is presented to the belt is a resilient and flexible backing member 28. As illustrated in particular in Figure 5 of the drawings, this backing member 28 includes a block 29 having projecting therefrom brushlike bristles 30. The block 29 is firmly secured to the upright 14 by means of an angle brace 31. The backing member 28 may have any number of tufts of bristles or rows thereof, but in the practical embodiment of my invention, I find that it is best to have the brush three rows of tufts wide and five rows of tufts long. This brushlike backing member forms a very important part of my invention in that it causes the abrasive belt to assume the shape of the egg transversely.

Figure 2:
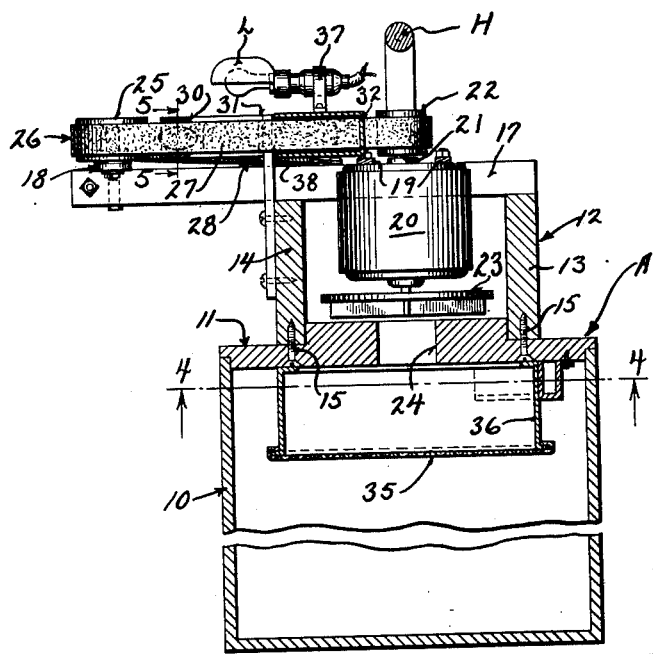
Figure 2 is a side elevational view in section of my machine, again showing in dotted lines the proper position of the egg to be cleaned, the section being taken on the line 2—2 of Figure 1, and looking in the direction of the arrows.

Another important feature of my invention is the fact that the cross section of the abrasive belt lies in a vertical plane (Figures 1 and 2) and that the direction of rotation of both stretches of the belt lies in the same horizontal plane so that an operator sitting adjacent to the machine can clearly see the cleaning of the spots as he holds the egg against the belt.

During the cleaning operation of the eggs, a large amount of dust is created, and in order to properly dispose of the dust, I provide an air intake nozzle 32 which is positioned adjacent to the egg cleaning stretch of the belt and just rearward of the spot where the egg is to be cleaned. It is to be noted that the direction of travel of the belt and dust is away from the egg and toward the air intake nozzle. This air nozzle 32 communicates with a suction pipe 33 which in turn opens out into a curved discharge channel 34. Consequently, the dust issuing from the egg and belt takes a circuitous path around the outer wall of the receptacle 10 (Fig. 4) and through centrifugal action is deposited in the bottom of the receptacle 10. The suction for this purpose is created by the fan 23 through the opening 24 in the cover 11, and in addition the air is drawn through a filter cloth 35 which is utilized to prevent the flow of dust from out of the receptacle. Filter 35 is secured to the bottom portion of a cylinder 36, which in turn has its upper periphery firmly fastened by nails to the bottom of the cover 11.

It is to be noted that for the convenience of the operator, I provide a small light L which may be secured by means of a bracket 37 adjacent to the top of the air nozzle 32. I also provide a handle H which is securely fastened to the beams 16 and 17 and which is utilized for carrying the machine to and from the place of use.

In utilizing my machine, an operator sits adjacent to the machine and takes one egg at a time and holds the same against the stretch 27 of the belt, and as the operator is looking down on the egg and the vertical edge of the belt, he can clearly see the proper engagement of the egg with the belt right up to the point of egg contact with the belt. In view of the construction of the belt tightener 18, the abrasive belt will give under slight pressure and the egg will assume the position as best shown in the dotted lines of Figure 1. The tension on the belt tightener may be varied slightly by placing the end of the spring 38 in any one of the aligned apertures 39 formed for that purpose. Consequently, when the egg is pressed against the belt it will take the curvature of the egg and sandpaper the spots off.

One of the salient features of my unit lies in the fact that the backing brush member (Figure 5) will form a resilient and flexible rest and assume the shape of the egg being cleaned, thereby resulting in the belt assuming the transverse contour of the egg.

From the foregoing, it is believed that the features and advantages of the invention will be readily apparent to those skilled in the art, and it will, of course, be understood that changes in the form, proportion and minor details of construction may be resorted to without departing from the spirit of the invention or the scope of the appended claims.

I claim:

1. In an egg cleaning machine, a base, a supporting frame secured to said base, a drive pulley carried by the frame and having its shaft lying in a vertical plane, a belt tensioning means including a pivoted spring tensioned arm carried by said frame, an idle pulley rotatably mounted on the outer end of said arm, an endless abrasive belt trained about the drive pulley and the idle pulley, said abrasive belt having its egg cleaning stretch lying in a vertical plane and having its direction of motion in a horizontal plane, means for imparting motion to the shaft of the drive pulley, and a brush backing member extending transversely of the belt adjacent to the inner face of the egg cleaning stretch and against which the belt is pressed when an egg is held against the belt.

2. In an egg cleaning machine, a base, a supporting frame secured to said base, a drive pulley carried by the frame and having its shaft lying in a vertical plane, belt tensioning means including a pivoted spring tensioned arm carried by said frame, an idle pulley rotatably mounted on the outer end of said arm, an endless abrasive belt trained about the drive pulley and the idle pulley, said abrasive belt having its egg cleaning stretch lying in a vertical plane and having its direction of motion in a horizontal plane, means for imparting motion to the shaft of the drive pulley, an intake suction nozzle arranged in spaced relation to the idle pulley, said egg cleaning stretch travelling toward said suction nozzle, and a brush backing member between the idle pulley and the intake suction nozzle, said brush backing member extending transversely of the belt adjacent to the inner face of the egg cleaning stretch and against which the belt is pressed when an egg is held against the belt.

3. In an egg cleaning machine, a base, a supporting frame secured to said base, a drive pulley carried by the frame and having its shaft lying in a vertical plane, belt tensioning means including a pivoted spring tensioned arm carried by said frame, an idle pulley rotatably mounted on the outer end of said arm, an endless abrasive belt trained about the drive pulley and the idle pulley, said abrasive belt having its egg cleaning stretch lying in a vertical plane and having its direction of motion in a horizontal plane, a flexible backing member carried by the frame and lying adjacent the rear surface of the egg cleaning stretch, said flexible backing member being so constructed and arranged as to cause the abrasive belt to assume the contour of an egg held there-against, and means for imparting motion to the shaft of the drive pulley.

4. In an egg cleaning machine, a receptacle, a cover for said receptacle, a supporting frame secured to said cover, an electric motor suspended from said frame and having its armature shaft lying in a vertical plane, a drive pulley keyed to the upper end of the armature shaft, belt tensioning means including a pivoted spring tensioned arm carried by said frame, an idle pulley rotatably mounted on the outer end of said arm, an endless abrasive belt trained about the drive pulley and the idle pulley, said abrasive belt having its egg cleaning stretch lying in a vertical plane and having its direction of motion in a horizontal plane, said cover having a central aperture formed therein communicating with the interior of said receptacle, and suction means including a suction fan keyed to the lower end of said armature shaft and positioned above said cover adjacent said opening, an air intake nozzle adjacent the egg cleaning stretch communicating with the interior of said receptacle, and an air filter positioned between said air intake nozzle and said cover aperture.

5. In an egg cleaning machine, a receptacle, a cover for said receptacle, a supporting frame secured to said cover, an electric motor suspended from said frame and having its armature shaft lying in a vertical plane, a drive pulley keyed to the upper end of the armature shaft, belt tensioning means including a pivoted spring tensioned arm carried by said frame, an idle pulley rotatably mounted on the outer end of said arm, and an endless abrasive belt trained about the drive pulley and the idle pulley, said abrasive belt having its egg cleaning stretch lying in a vertical plane and having its direction of motion in a horizontal plane, and suction means including a suction nozzle adjacent the egg cleaning stretch and communicating with the interior of said receptacle.

6. In an egg cleaning machine, a base, a supporting frame secured to said base, a drive pulley carried by the frame, belt tensioning means including a pivoted spring tensioned arm carried by said frame, an idle pulley rotatably mounted on the outer end of said arm, an endless abrasive belt trained about the drive pulley and the idle pulley, means for imparting motion to the shaft of the drive pulley, and a brush backing member extending transversely of the belt adjacent to the inner face of the egg cleaning stretch and against which the belt is pressed when an egg is held against the belt.

7. In an egg cleaning machine, a base, a supporting frame secured to said base, a drive pulley carried by the frame, belt tensioning means including a pivoted spring tensioned arm carried by said frame, an idle pulley rotatably mounted on the outer end of said arm, an endless abrasive belt trained about the drive pulley and the idle pulley, means for imparting motion to the shaft of the drive pulley, an intake suction nozzle arranged in spaced relation to the idle pulley, said egg cleaning stretch travelling toward said suction nozzle, and a brush backing member between the idle pulley and the intake suction nozzle, said brush backing member extending transversely of the belt adjacent to the inner face of the egg cleaning stretch and against which the belt is pressed when an egg is held against the belt.

8. In an egg cleaning machine, a base, a supporting frame secured to said base, a drive pulley carried by the frame, belt tensioning means including a pivoted spring tensioned arm carried by said frame, an idle pulley rotatably mounted on the outer end of said arm, an endless abrasive belt trained about the drive pulley and the idle pulley, a flexible backing member carried by the frame and lying adjacent the rear surface of the egg cleaning stretch, said flexible backing member being so constructed and arranged as to cause the abrasive belt to assume the contour of an egg held there-against, and means for imparting motion to the shaft of the drive pulley.

GLENN ASPINALL.

References Cited in the file of this patent

UNITED STATES PATENTS

| Number | Name | Date |
|---|---|---|
| 59,916 | Maloy | Nov. 20, 1866 |
| 598,671 | Driver | Feb. 8, 1898 |
| 1,018,562 | Holmes | Feb. 27, 1912 |
| 1,228,856 | Washburn | June 5, 1917 |
| 1,286,560 | Docter | Dec. 3, 1918 |
| 1,493,779 | Humphreys | May 13, 1924 |
| 1,506,745 | Griffith | Sept. 2, 1924 |
| 2,513,449 | Caldwell | July 4, 1950 |